United States Patent [19]
Kobelt

[11] 3,722,636
[45] Mar. 27, 1973

[54] AUTOMATIC HOLDING DISK BRAKE

[76] Inventor: Jack R. Kobelt, 235 East 5th Avenue, Vancouver, British Columbia, Canada

[22] Filed: Apr. 23, 1971

[21] Appl. No.: 136,873

[52] U.S. Cl..................................188/170, 188/72.6
[51] Int. Cl................................................F16d 65/24
[58] Field of Search......108/170, 59, 72.9, 72.6, 72.7

[56] References Cited

UNITED STATES PATENTS

| 343,680 | 6/1886 | Tribe | 188/72.6 |
| 3,621,943 | 5/1970 | Frank | 188/170 |

Primary Examiner—Richard E. Aegerter

[57] ABSTRACT

This disclosure pertains to that class of braking devices known as disk brakes, and more particularly to disk brakes which are automatically actuated by a fluid to hold or release a shaft, the fluid itself being energized directly or indirectly by the machine of which the aforementioned shaft is a part. A preferred embodiment of the invention is disclosed in detail wherein a disk is mounted on a propeller shaft coupled to a geared transmission, two brake shoes of the invention being actuated by a coil spring to hold the disk and actuated to release the disk by a fluid power cylinder interconnected with the lubrication system of the geared transmission. The aforementioned brake shoes are interconnected with the coil spring and power cylinder such that a small spring force generates a large brake holding force and, conversely, a small fluid pressure releases the brake.

7 Claims, 3 Drawing Figures

PATENTED MAR 27 1973 3,722,636

AUTOMATIC HOLDING DISK BRAKE

This invention relates to novel improvements in devices which are known in the art to which they pertain as disk brakes or to devices belonging to or of the general character of brakes having brake shoe calipers which apply braking forces of substantially equal magnitude to the opposite sides of a rotatable disk. In particular, this invention employs novel means whereby a fail-safe braking force is automatically applied to a disk mounted on a shaft when the shaft-driver is inactive. Activation of the driver automatically releases the brake.

Devices such as hoists and cranes normally utilize a braking means to hold a load indefinitely at a given position when their cable drum driving means is idle or used for an ancillary function. The braking devices used at present vary in concept and include band brakes on a cable drum, plate and drum clutches, and electromagnetic block brakes mounted on the fastest shaft in the power transmission system. Such brakes may be applied and released automatically or manually.

A brake application similar in nature to that in hoists and cranes is that pertaining to propeller shafts of sailboats and skiffs which are often propelled by forces other than their propeller. In such cases of other-propulsion, the propeller is driven by the motion of the boat. Where the propeller shaft is connected to a force-lubricated power transmission, the transmission lubrication system does not generate sufficient pressure to provide adequate lubrication. Consequently, extended rotation of the propeller shaft without transmission lubrication results in excessive component wear and often complete failure of the transmission. Therefore, whereas many applications of the present invention will be readily apparent to one skilled in the art, the invention is directed primarily at providing a fail-safe disk brake for mounting on a propeller shaft, release of the brake being accomplished automatically by the energizing of the oil in the propeller shaft power transmission lubrication system. Besides automatic fail-safe application and release, another important requirement of a propeller shaft brake is compactness inasmuch as space in waterborne vessels is normally very limited, particularly in the area around the propeller shaft. Another requirement is a substantial holding force generated with low actuating and releasing pressures or forces. Still further requirements are ease of replacement of brake shoes, a means for adjusting for brake shoe wear, and simplicity of construction.

It is one object of the present invention to provide an improved disk brake assembly, especially designed to hold a propeller shaft fail-safe and to release it automatically when the shaft prime mover is respectively idle and active.

It is a further object of this invention to provide a brake application force substantially greater than the holding and releasing actuating forces.

Still another object of this invention is to provide a disk brake assembly of compact and efficient construction.

Yet another object of this invention is to provide a disk brake assembly utilizing an actuating linkage having provisions for ready adjustment to accommodate brake shoe wear.

These and still further objects and advantages of the present invention reside in the details of construction of a preferred embodiment disclosed herein and will be evident to one skilled in the art from a study of this specification and the accompanying drawings. Therefore, the preferred embodiment disclosed is merely exemplary and is not intended to detract from the full scope of the invention as set out in the annexed claims.

In the drawings, wherein like numerals refer to like parts:

Figure 1:
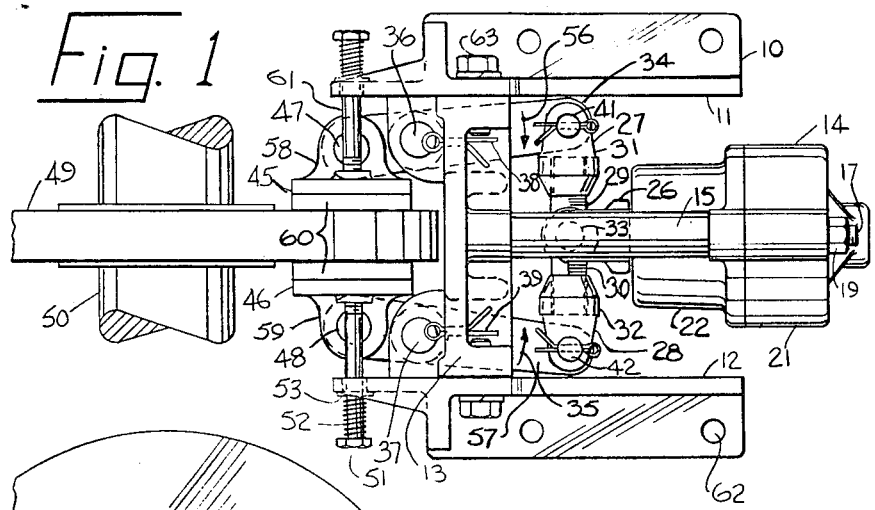
FIG. 1 is a plan view of a disk brake assembly in accordance with a preferred embodiment of the present invention.
Figure 2:
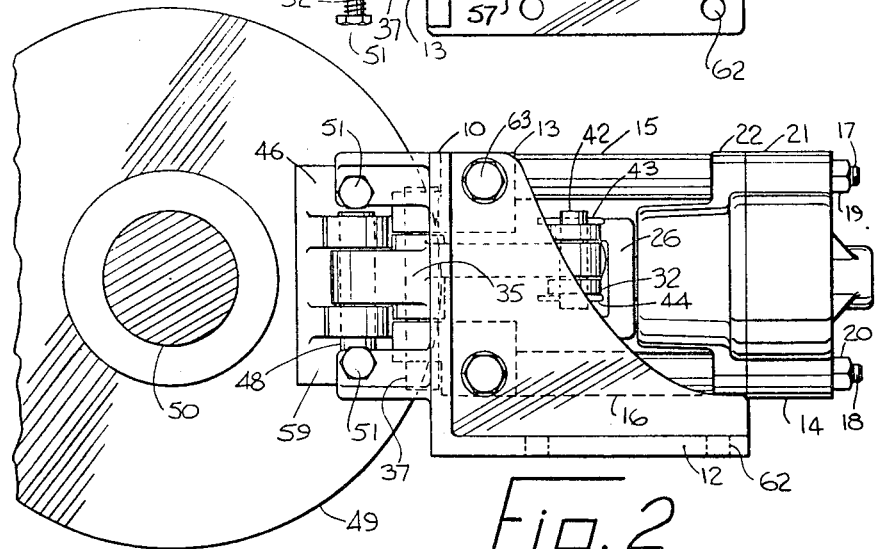
FIG. 2 is a side view of the disk brake assembly of FIG. 1.
Figure 3:
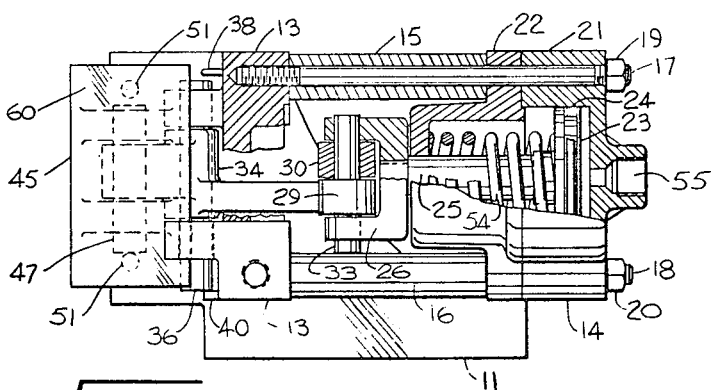
FIG. 3 is a partial sectional view of the assembly of FIG. 1 with one side bracket of the caliper frame removed.

Turning now to the drawings, FIGS. 1, 2, and 3 illustrate three views of a preferred embodiment of the present invention wherein a caliper frame 10 comprises side brackets 11 and 12 secured to fulcrum plate 13 by four bolts typically denoted 63. Linear actuator 14 is assembled and secured to fulcrum plate 13 by means of compression struts 15 and 16 and studs 17 and 18 having nuts 19 and 20 respectively. The cylinder part of linear actuator 14 comprises rear section 21 and forward section 22. The piston part of linear actuator 14 comprises piston 23, seal 24 and rod extension 25. Threaded onto the end of rod extension 25 is clevis 26. Actuator links 27 and 28, respectively comprising threaded male eye sections 29 and 30 and female clevis sections 31 and 32, are pivotally mounted in clevis 26 by pin 33. Pin 33 is retained axially by compression struts 15 and 16.

Actuator levers 34 and 35 are pivotally mounted in fulcrum plate 13 respectively by means of pins 36 and 37. Pins 36 and 37 are retained axially by cotter pins 38 and 39 and two tabs shown typically by 40 in FIG. 3, said tabs being an integral part of fulcrum plate 13. Actuating levers 34 and 35 are pivotally connected at one end respectively to female clevis sections 31 and 32 of actuator links 27 and 28 by means of pins 41 and 42. Pins 41 and 42 are retained axially by means of four cotter pins, typically denoted 43 and 44 on pin 42. The other end of each of actuator levers 34 and 35 is pivotally interconnected respectively to brake shoes 45 and 46 by means of pivot pins 47 and 48. Brake shoes 45 and 46 comprise clevis plates 58 and 59 and friction material 60 and are in opposed face to face relation, one on each side of disk 49. Typically installed, disk 49 would be secured to propeller shaft 50 and caliper frame 10 would be secured to the vessel hull by means of bolts using holes 62 in side brackets 11 and 12.

Four slack adjuster means typically comprising bolts 51, coil springs 52, and washers 53 take up linkage slack resulting from clearances in the pivotal connections at pivot pins 36, 37, 41, 42, 33, 47 and 48 and maintain alignment, thus ensuring that the brake shoes will completely clear the disk in the released mode. In addition, the shanks 61 of bolts 51 retain axially pivot pins 47 and 48.

In operation the foregoing disclosure of a preferred embodiment of the present invention holds disk 49 when brake shoes 45 and 46 are forced against each side thereof and releases disk 49 when the shoes 45 and 46 are retracted. Spring means comprising compression coil spring 54 applies co-axial forces equal in magnitude and opposite in direction respectively against cylinder forward section 22 and piston 23, thus forcing piston 23 back into cylinder rear section 21 until brake shoes 45 and 46 rest against disk 49. Piston 23 does not rest against the back of cylinder rear section 21, thus leaving a cavity into which an energized fluid (not shown) may flow through port 55 and counteract the equal and opposite forces of spring 54. Provided that the pressure of the aforementioned energized fluid acting against the area of piston 23 develops a force greater than that of compression spring 54, the piston will move toward cylinder forward section 22, rod extension 25 will carry clevis 26 away from forward section 22, and actuating links 27 and 28 will rotate actuator levers 34 and 35 respectively in directions 56 and 57. Hence, brake shoes 45 and 46 are held fast against disk 49 by spring 54 and are withdrawn by an energized fluid acting against piston 23. The operation of the disk brake is therefore fail-safe inasmuch as a failure in fluid pressure or supply will automatically cause the brake to be actuated by spring 54.

It will be evident to one skilled in the art that the holding force of the brake shoes 45 and 46 on disk 49 will depend on the nature of the surfaces and materials of disk 49 and friction material 60 as well as the proportions of actuator levers 34 and 35 and actuator links 27 and 28. Moreover it will be evident that a large movement of clevis 26 by spring 54 will result in a small movement of brake shoes 45 and 46; hence, a small spring force will result in a large brake application force.

Although there is sufficient movement in linear actuator 14 to compensate for some wear, means are provided in actuator links 27 and 28 whereby their length may be increased to compensate for wear of friction material 60. This is accomplished by pivot pins 41 and 42 being removed and female clevis sections 31 and 32 being unscrewed one or more half-turns.

Finally, where disk 49 is secured to a propeller shaft of a sailboat or skiff, the energized fluid counteracting spring 54 may be supplied by the lubrication system of the power transmission driving the propeller shaft. On the other hand, the fluid could be supplied by a pneumatic/hydraulic booster or intensifier actuated by the electrical system of the prime mover of the vessel.

It will be appreciated that the foregoing discloses only a preferred embodiment of the invention. Further, many equivalents, changes, and modifications will readily occur to one skilled in the art, particularly in view of the above teachings. For example, whereas actuator levers 34 and 35 are interconnected to piston rod extension 25 by means of actuating links 27 and 28, a cam might replace clevis 26 and roller cam followers rotatably mounted on pivot pins 41 and 42. Whereas in the disclosed embodiment the spring means actuating the brake is a compression coil spring it could be other mechanical spring means, including a tension coil spring, and further it could be external. Whereas the disclosed spring means is a mechanical coil spring, it could be a pneumatic spring contained within linear actuator 14 on one side of piston 23 and supplied by a compressor, gas bottle or other such gas energizing means. Whereas in the disclosed embodiment of the invention the cylinder part of linear actuator 14 is secured to caliper frame 10 and the piston part moves relative thereto, the piston part could be secured to the caliper frame with the cylinder part moving relative thereto. Whereas the fulcra of actuating levers 34 and 35 are located intermediate the points of effort and load, an embodiment may be envisioned wherein the fulcra of the actuating levers is outside the points of effort and load. Hence, the present invention is not to be construed as limited to the specific details above illustrated and described.

The embodiments of the invention in which an exclusive property or privilege is claimed are defined as follows:

1. In combination with a disk, a brake caliper assembly comprising a caliper frame, a linear actuator having a cylinder part and a piston part, one of said parts of said linear actuator operatively secured to said caliper frame, spring means applying equal and opposite co-axial forces respectively to said cylinder and piston parts, a fluid in said linear actuator opposing when energized said spring forces on said piston and cylinder parts, a pair of brake shoes in opposed face to face relation, one of said brake shoes on each side of said disk, each of a pair of actuating levers pivotally mounted in said caliper frame, a pair of actuating links, each of said actuating levers pivotally connected substantially at one end to one of said brake shoes and at its other end interconnected to one of (a) said pair of actuating links, each of said actuated links interconnected to the other of said parts of said linear actuator whereby energizing said fluid causes said brake shoes to release said disk and de-energizing said fluid causes said brake shoes to hold said disk.

2. Apparatus as defined in claim 1, further wherein said spring means is contained within said linear actuator.

3. Apparatus as defined in claim 1, further wherein spring actuated slack adjuster means interconnect said brake shoes to said caliper frame.

4. Apparatus as defined in claim 1, further wherein said spring means comprises a coil spring.

5. Apparatus as defined in claim 1, further wherein each of said actuating links comprises length adjusting means.

6. Apparatus as defined in claim 1, further wherein said spring means comprises a pneumatic spring.

7. In combination with a disk mounted on a power transmission shaft, a brake caliper assembly comprising a caliper frame, a linear actuator comprising a cylinder and piston, said cylinder operatively secured to said caliper frame, a coil spring applying equal and opposite co-axial forces respectively to said cylinder and piston, within said linear actuator a fluid energized by the lubrication system of said power transmission, said energized fluid opposing said forces of said coil spring on said piston and cylinder, a pair of actuating levers pivotally mounted in said caliper frame, a pair of brake shoes in opposed face to face relation, one of said brake shoes on each side of said disk, a pair of actuating links, each of said actuating levers pivotally connected substantially at one end to one of said brake shoes and at its other end pivotally connected to one of (a) said pair of actuating links, each of said actuating links interconnected to said piston whereby energizing said fluid causes said brake shoes to release said disk and de-energizing said fluid causes said brake shoes to hold said disk.

* * * * *